(12) United States Patent
Bright

(10) Patent No.: US 10,724,273 B1
(45) Date of Patent: Jul. 28, 2020

(54) CABINET SECURITY ASSEMBLY

(71) Applicant: Justin Bright, Jerome, ID (US)

(72) Inventor: Justin Bright, Jerome, ID (US)

( * ) Notice: Subject to any disclaimer, the term of this patent is extended or adjusted under 35 U.S.C. 154(b) by 0 days.

(21) Appl. No.: 16/669,604

(22) Filed: Oct. 31, 2019

(51) Int. Cl.
*H04N 7/18* (2006.01)
*E05B 47/00* (2006.01)
*H04N 5/225* (2006.01)
*G08B 17/117* (2006.01)
*E05B 17/10* (2006.01)
*G07C 9/00* (2020.01)

(52) U.S. Cl.
CPC .......... *E05B 47/0001* (2013.01); *E05B 17/10* (2013.01); *G07C 9/00309* (2013.01); *G08B 17/117* (2013.01); *H04N 5/2252* (2013.01); *H04N 5/2253* (2013.01); *H04N 5/2256* (2013.01); *H04N 7/183* (2013.01); *E05B 2047/0048* (2013.01); *E05B 2047/0058* (2013.01); *E05Y 2900/20* (2013.01)

(58) Field of Classification Search
CPC ..... H04N 5/2256; H04N 5/2252; H04N 7/183
See application file for complete search history.

(56) References Cited

U.S. PATENT DOCUMENTS

| 5,337,588 A | * | 8/1994 | Chhatwal | ................ E05B 17/22 264/264 |
| 9,739,083 B2 | | 8/2017 | Hermann | |
| 9,784,497 B2 | | 10/2017 | Wang | |
| 9,857,071 B2 | | 1/2018 | Cano | |
| 10,643,412 B1 | * | 5/2020 | Yang | ...................... H04N 7/183 |
| 2011/0084802 A1 | * | 4/2011 | Choi | ...................... E05B 17/10 340/6.1 |
| 2014/0240504 A1 | * | 8/2014 | Cho | ........................ H04N 7/186 348/155 |
| 2016/0150881 A1 | | 6/2016 | Weissenbach | |
| 2017/0032446 A1 | | 2/2017 | Merz | |
| 2017/0263067 A1 | * | 9/2017 | Scalisi | .............. G07C 9/00174 |
| 2018/0108192 A1 | * | 4/2018 | Ho | ......................... G06Q 10/08 |
| 2018/0121773 A1 | | 5/2018 | Tercsinecz | |
| 2018/0149351 A1 | | 5/2018 | Wallace | |
| 2018/0266145 A1 | * | 9/2018 | Chou | ..................... E05B 1/003 |
| 2018/0315265 A1 | * | 11/2018 | Zabala Zabaleta | ......................... G07C 9/00912 |
| 2018/0342329 A1 | | 11/2018 | Rufo | |
| 2019/0327098 A1 | * | 10/2019 | Hart | ................... G07C 9/00571 |

FOREIGN PATENT DOCUMENTS

WO    WO2016022177    2/2016

* cited by examiner

*Primary Examiner* — Fabio S Lima

(57) ABSTRACT

A cabinet security assembly includes a housing that is mountable to a cabinet door such that the housing is positioned within a cabinet when the cabinet door is closed. A light emitter is coupled to the housing and the light emitter emits light outwardly from the housing when the light emitter is turned on. A receiver is coupled to and extends away from the housing. The receiver is comprised of a translucent material to pass light therethrough. The receiver insertably receives a handle of the cabinet door to transfer the light from the light receiver into the handle for ornamental purposes. A lock is movably coupled to the housing and the lock is actuatable into a locking position to engage the cabinet for locking the cabinet door in a closed position.

13 Claims, 6 Drawing Sheets

CABINET SECURITY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to security devices and more particularly pertains to a new security device for remotely locking and unlocking a cabinet door.

(2) Description of Related Art Including Information Disclosed Under 37 CFR 1.97 and 1.98

The prior art relates to security devices.

BRIEF SUMMARY OF THE INVENTION

An embodiment of the disclosure meets the needs presented above by generally comprising a housing that is mountable to a cabinet door such that the housing is positioned within a cabinet when the cabinet door is closed. A light emitter is coupled to the housing and the light emitter emits light outwardly from the housing when the light emitter is turned on. A receiver is coupled to and extends away from the housing. The receiver is comprised of a translucent material to pass light therethrough. The receiver insertably receives a handle of the cabinet door to transfer the light from the light receiver into the handle for ornamental purposes. A lock is movably coupled to the housing and the lock is actuatable into a locking position to engage the cabinet for locking the cabinet door in a closed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
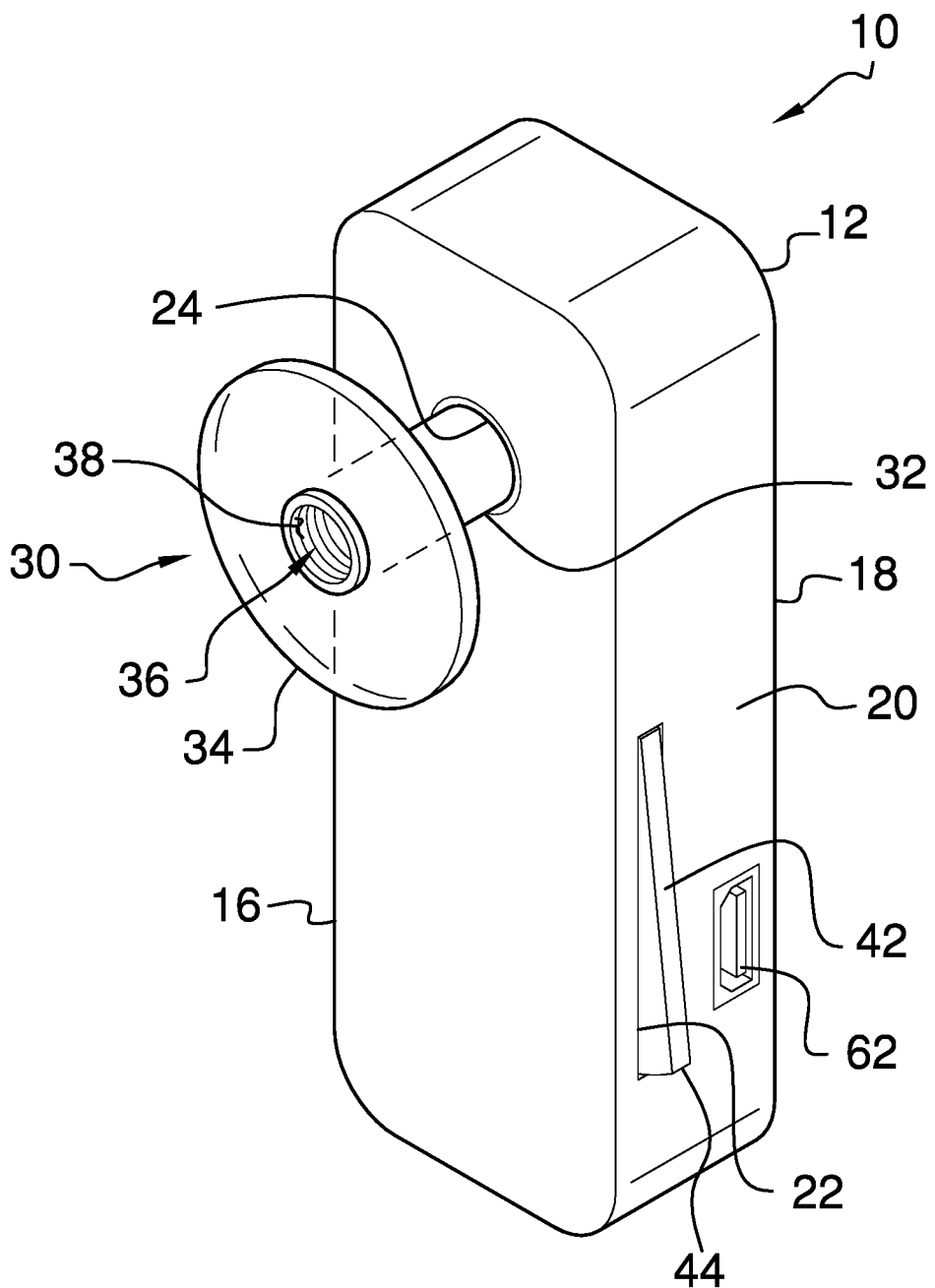
FIG. 1 is a perspective view of a cabinet security assembly according to an embodiment of the disclosure.
Figure 2:
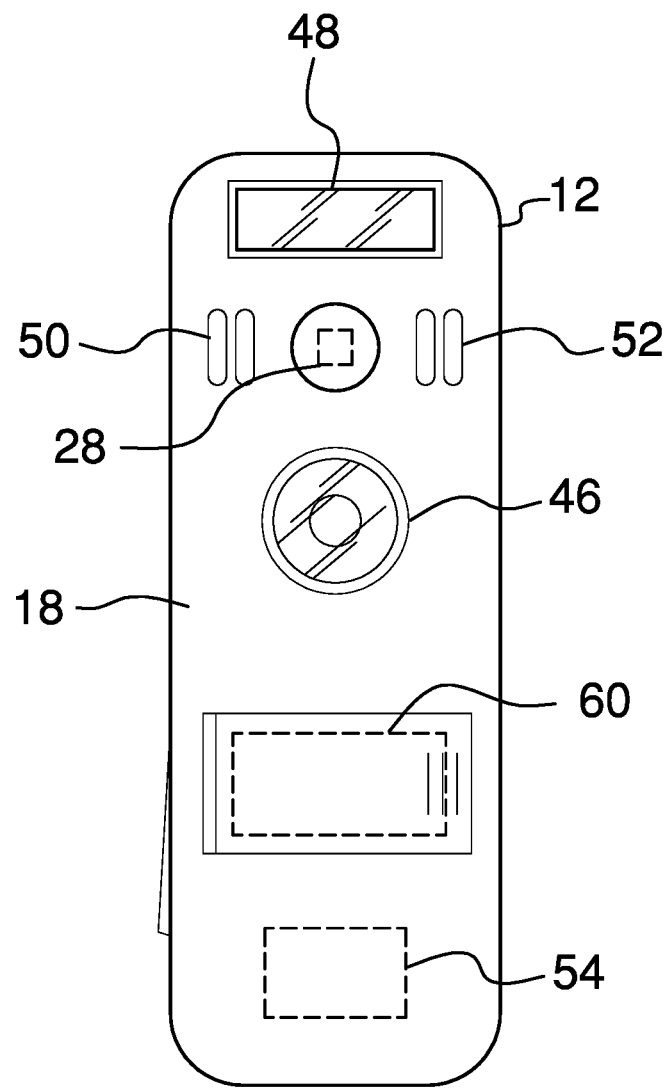
FIG. 2 is a back view of an embodiment of the disclosure.
Figure 3:
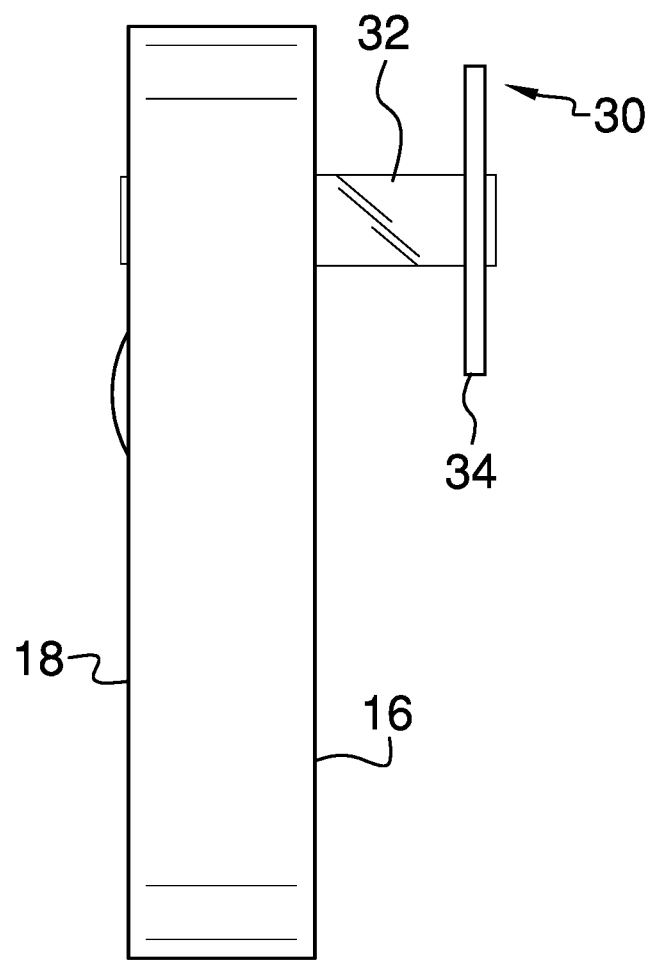
FIG. 3 is a right side view of an embodiment of the disclosure.
Figure 4:
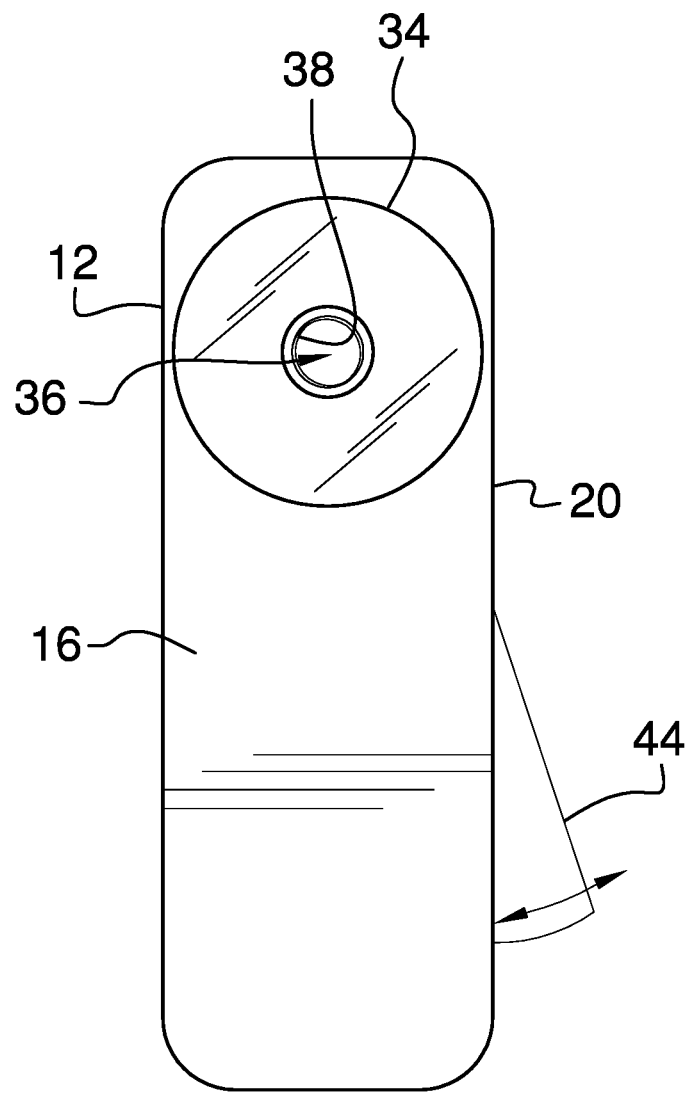
FIG. 4 is a front view of an embodiment of the disclosure.
Figure 5:
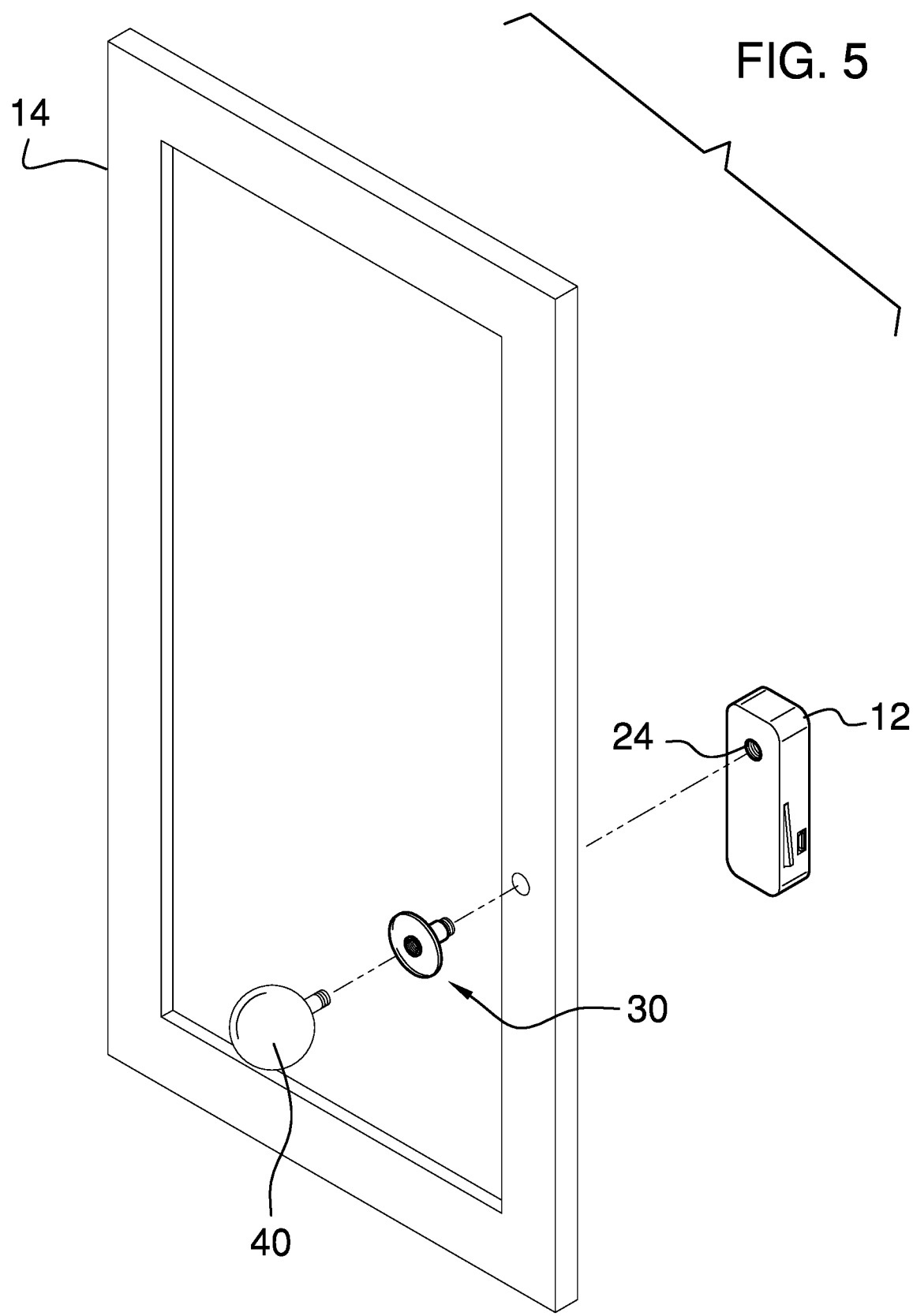
FIG. 5 is an exploded perspective view of an embodiment of the disclosure.
Figure 6:
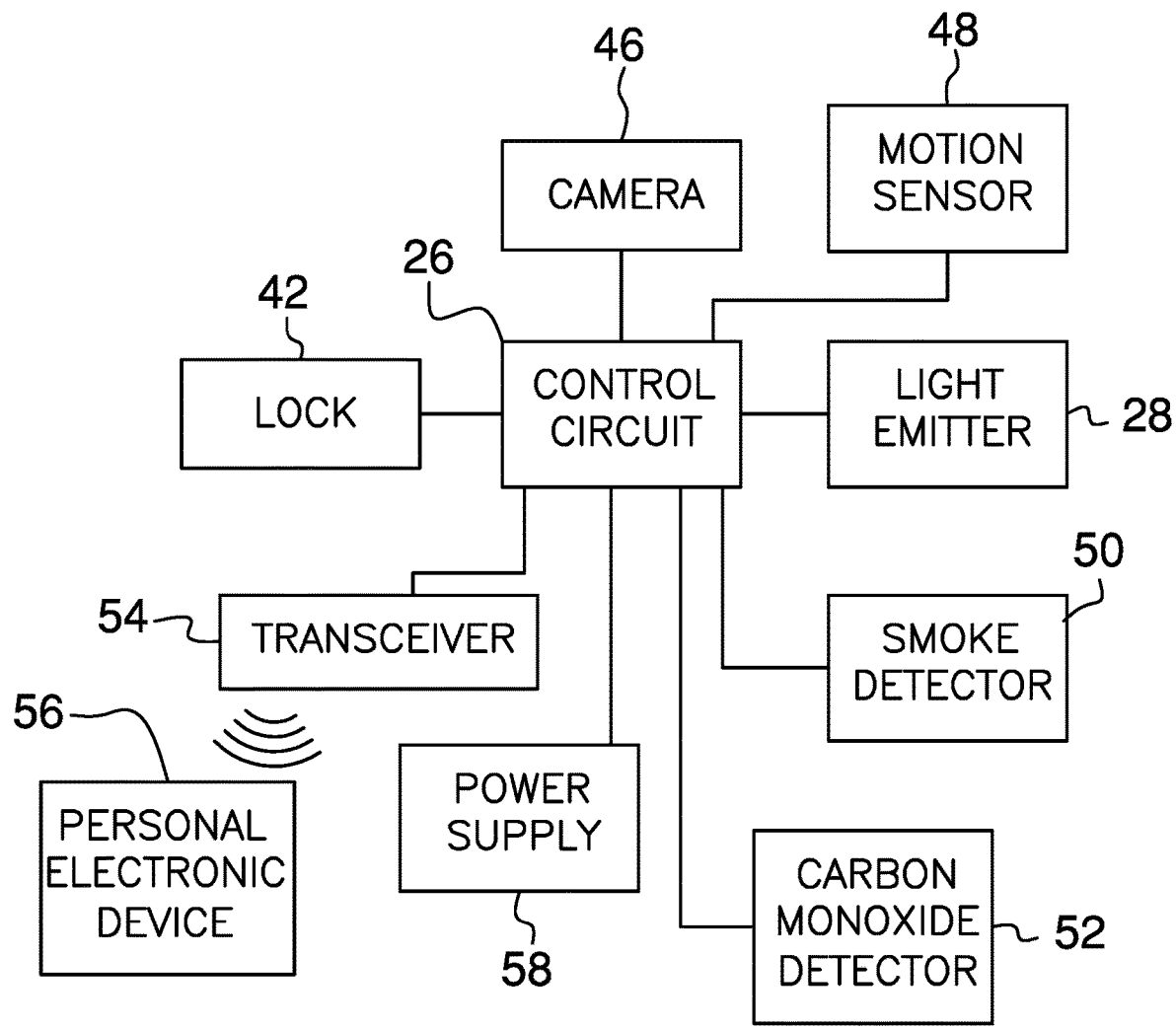
FIG. 6 is a schematic view of an embodiment of the disclosure.

With reference now to the drawings, and in particular to FIGS. 1 through 6 thereof, a new security device embodying the principles and concepts of an embodiment of the disclosure and generally designated by the reference numeral 10 will be described.

As best illustrated in FIGS. 1 through 6, the cabinet security assembly 10 generally comprises a housing 12 that is mountable to a cabinet door 14 such that the housing 12 is positioned within a cabinet when the cabinet door 14 is closed. The cabinet may be a kitchen cabinet, a tool cabinet or any type of cabinet employed for storage. The housing 12 has a front wall 16, a back wall 18 and a first lateral wall 20. The first lateral wall 20 has a lock slot 22 extending into an interior of the housing 12 and the front wall 16 has a light opening 24 extending into an interior of the housing 12. A control circuit 26 is coupled to the housing 12 and the control circuit 26 receives a lock input, an unlock input, a motion input and an alert input.

A light emitter 28 is coupled to the housing 12 and the light emitter 28 emits light outwardly from the housing 12 when the light emitter 28 is turned on. The light emitter 28 is electrically coupled to the control circuit 26. Additionally, the light emitter 28 is aligned with the light opening 24 in the front wall 16 of the housing 12 for emitting light outwardly therefrom. The light emitter 28 may comprise an LED or other electronic light emitter.

A receiver 30 is removably coupled to and extends away from the housing 12. The receiver 30 is comprised of a translucent material to pass light therethrough. Additionally, the receiver 30 is aligned with the light emitter 28 such that light from the light emitter 28 travels through the receiver 30. The receiver 30 includes a stem 32 and a disk 34 that is coupled to the stem 32. The disk 34 lies on a plane that is perpendicular to a longitudinal axis of the stem 32. The receiver 30 has an aperture 36 extending through the stem 32 and the disk 34. The aperture 36 has a bounding surface 38 and the bounding surface 38 is threaded. The stem 32 engages the light opening 24 in the front wall 16 of the housing 12 having the disk 34 being spaced from the front wall 16.

The stem 32 is inserted through the cabinet door 14 and the stem 32 is threaded into the light opening 24 in the front wall 16 of the housing 12. The aperture 36 insertably receives a handle 40 of the cabinet door 14. In this way the receiver 30 transfers the light from the light receiver 30 into the handle 40 for ornamental purposes. The handle 40 threadably engages the bounding surface 38 of the aperture 36 in the receiver 30 for attaching the housing 12 and the handle 40 to the cabinet door 14. The handle 40 may be a glass cabinet handle or other type of handle that is comprised of a translucent material.

A lock 42 is provided and the lock 42 is movably coupled to the housing 12. The lock 42 is actuatable into a locking position to engage the cabinet for locking the cabinet door 14 in a closed position. The lock 42 is actuatable into an unlocked position having the lock 42 disengaging the cabinet to facilitate the cabinet door 14 to be opened. The lock 42 is electrically coupled to the control circuit 26.

The lock 42 includes an engagement 44 that extends outwardly through the lock slot 22 in the first lateral wall 20 of the housing 12 when the lock 42 is actuated into the locking position. In this way the engagement 44 can engage the cabinet for locking the cabinet door 14. The engagement 44 is recessed into the lock slot 22 when the lock 42 is actuated into the unlocked position. The lock 42 is actuated into the locking position when the control circuit 26 receives the lock input. Moreover, the lock 42 is actuated into the unlocked position when the control circuit 26 receives the unlock input. The lock 42 may include an actuator that is coupled to the engagement 44 for moving the engagement 44.

A camera 46 is coupled to the housing 12 and the camera 46 records video of an interior of the cabinet. The camera 46 is positioned on the back wall 18 of the housing 12 and the camera 46 is electrically coupled to the control circuit 26. Additionally, the camera 46 is turned on when the control circuit 26 receives the motion input. The camera 46 may comprise digital video camera or the like.

A motion sensor 48 is coupled to the housing 12 to sense motion of the cabinet door 14 when the cabinet door 14 is opened. The motion sensor 48 is electrically coupled to the control circuit 26 and the motion sensor 48 is positioned on the back wall 18 of the housing 12. The control circuit 26 receives the motion input when the motion sensor 48 senses motion. Additionally, the motion sensor 48 may comprise an electronic motion sensor, including but not being limited to infrared motion sensors.

A smoke detector 50 is coupled to the housing 12 to detect smoke in the cabinet. The smoke detector 50 is electrically coupled to the control circuit 26 and the control circuit 26 receives the alert input when the smoke detector 50 detects smoke. The smoke detector 50 may be an electronic smoke detector of any conventional design. A carbon monoxide detector 52 is coupled to the housing 12 to detect carbon monoxide in the cabinet. The carbon monoxide detector 52 is electrically coupled to the control circuit 26 and the control circuit 26 receives the alert input when the carbon monoxide detector 52 detects carbon monoxide. The carbon monoxide detector 52 may comprise an electronic carbon monoxide detector of any conventional design.

A transceiver 54 is coupled to the housing 12 and the transceiver 54 is electrically coupled to the control circuit 26. The transceiver 54 is in electrical communication with a personal electronic device 56 to facilitate a user to remotely monitor the cabinet. The personal electronic device 56 may be a smart phone or the like and the personal electronic device 56 may store operational software, such as a smart phone app or the like. The transceiver 54 may comprise a radio frequency transceiver or the like and the transceiver 54 may employ a WPAN signal thereby facilitating the transceiver 54 to be in communication with the personal electronic device 56 via a wifi router or other means of wireless communication.

The transceiver 54 receives a lock command and an unlock command from the personal electronic device 56. The control circuit 26 receives the lock input when the transceiver 54 receives the lock command. Additionally, the control circuit 26 receives the unlock input when the transceiver 54 receives the unlock command. The personal electronic device 56 may issue an audible or visual alert when the control circuit 26 receives the alert input. In this way a user can be remotely notified when the smoke detector 50 detects smoke or when the carbon monoxide sensor senses carbon monoxide.

A power supply 58 is coupled to the housing 12 and the power supply 58 is electrically coupled to the control circuit 26. The power supply 58 includes at least one battery 60 that is positioned in the housing 12 and the at least one battery 60 is electrically coupled to the control circuit 26. The power supply 58 includes a charge port 62 that is recessed into the housing 12 to receive a charge cord. The charge port 62 is electrically coupled to the at least one battery 60 for charging the at least one battery 60.

In use, the stem 32 of the receiver 30 is extended through the cabinet door 14 to engage the light opening 24 in the housing. The handle 40 is attached to the disk 34 by threadably engaging the aperture 36 in the receiver 30. Thus, the handle 40 is illuminated when the light emitter 28 is turned on. Additionally, the camera 46 begins recording video footage when the motion sensor 48 senses motion. The transceiver 54 facilitates the personal electronic device 56 to monitor the footage captured by the camera 46. Additionally, the personal electronic device 56 emits the visual alert or the audible alert when the smoke detector 50 detects smoke or when the carbon monoxide detector 52 detects carbon monoxide.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cabinet security assembly being configured to lock and surveil a cabinet, said assembly comprising:

a housing being mountable to a cabinet door such that said housing is positioned within a cabinet when the cabinet door is closed;

a light emitter being coupled to said housing, said light emitter emitting light outwardly from said housing when said light emitter is turned on;

a receiver being coupled to and extending away from said housing, said receiver being comprised of a translucent material wherein said receiver is configured to pass light therethrough, said receiver being aligned with said light emitter such that light from said light emitter travels through said receiver, said receiver insertably receiving a handle of the cabinet door wherein said receiver is configured to transfer the light from said light receiver into the handle for ornamental purposes;

a lock being movably coupled to said housing, said lock being actuatable into a locking position to engage the cabinet for locking the cabinet door in a closed position, said lock being actuatable into an unlocked position having said lock disengaging the cabinet to facilitate the cabinet door to be opened;

a camera being coupled to said housing wherein said camera is configured to record video of an interior of the cabinet;

a motion sensor being coupled to said housing wherein said motion sensor is configured to sense motion of the cabinet door when the cabinet door is opened; and a transceiver being coupled to said housing, said transceiver being electrically coupled to a control circuit, said transceiver being in electrical communication with a personal electronic device wherein said transceiver is configured to facilitate a user to remotely monitor the cabinet.

2. The assembly according to claim 1, wherein said housing has a front wall, a back wall and a first lateral wall, said first lateral wall having a lock slot extending into an interior of said housing, said front wall having a light opening extending into an interior of said housing.

3. The assembly according to claim 2, wherein the control circuit is coupled to said housing, said control circuit receiving a lock input, an unlock input, a motion input and an alert input.

4. The assembly according to claim 2, wherein said light emitter is electrically coupled to said control circuit, said light emitter being aligned with said light opening in said front wall of said housing for emitting light outwardly therefrom.

5. The assembly according to claim 4, wherein said receiver includes a stem and a disk being coupled to said stem, said receiver having an aperture extending through said stem and said disk, said aperture having a bounding surface, said bounding surface being threaded, said stem engaging said light opening in said front wall of said housing having said disk being spaced from said front wall, said disk abutting the cabinet door having said aperture being aligned with a handle opening in the cabinet door.

6. The assembly according to claim 5, wherein said lock is electrically coupled to said control circuit, said lock including an engagement that extends outwardly through said lock slot in said first lateral wall of said housing when said lock is actuated into said locking position such that said engagement engages the cabinet, said engagement being recessed into said lock slot when said lock is actuated into said unlocked position, said lock being actuated into said locking position when said control circuit receives said lock input, said lock being actuated into said unlocked position when said control circuit receives said unlock input.

7. The assembly according to claim 3, wherein said camera is positioned on said back wall of said housing, said camera being electrically coupled to said control circuit, said camera being turned on when said control circuit receives said motion input.

8. The assembly according to claim 7, wherein said motion sensor is electrically coupled to said control circuit, said motion sensor being positioned on said back wall of said housing, said control circuit receiving said motion input when said motion sensor senses motion.

9. The assembly according to claim 3, further comprising a smoke detector being coupled to said housing wherein said smoke detector is configured to detect smoke in the cabinet, said smoke detector being electrically coupled to said control circuit, said control circuit receiving said alert input when said smoke detector detects smoke.

10. The assembly according to claim 9, further comprising a carbon monoxide detector being coupled to said housing wherein said carbon monoxide detector is configured to detect carbon monoxide in the cabinet, said carbon monoxide detector being electrically coupled to said control circuit, said control circuit receiving said alert input when said carbon monoxide detector detects carbon monoxide.

11. The assembly according to claim 3, wherein said transceiver receives a lock command and an unlock command from the personal electronic device, said control circuit receiving said lock input when said transceiver receives said lock command, said control circuit receiving said unlock input when said transceiver receives said unlock command.

12. The assembly according to claim 3, further comprising a power supply being coupled to said housing, said power supply being electrically coupled to said control circuit, said power supply comprising:

at least one battery being positioned in said housing, said at least one battery being electrically coupled to said control circuit; and a charge port being recessed into said housing wherein said charge port is configured to receive a charge cord, said charge port being electrically coupled to said at least one battery for charging said at least one battery.

13. A cabinet security assembly being configured to lock and surveil a cabinet, said assembly comprising:

a housing being mountable to a cabinet door such that said housing is positioned within a cabinet when the cabinet door is closed, said housing having a front wall, a back wall and a first lateral wall, said first lateral wall having a lock slot extending into an interior of said housing, said front wall having a light opening extending into an interior of said housing;

a control circuit being coupled to said housing, said control circuit receiving a lock input, an unlock input, a motion input and an alert input;

a light emitter being coupled to said housing, said light emitter emitting light outwardly from said housing when said light emitter is turned on, said light emitter being electrically coupled to said control circuit, said light emitter being aligned with said light opening in said front wall of said housing for emitting light outwardly therefrom;

a receiver being coupled to and extending away from said housing, said receiver being comprised of a translucent material wherein said receiver is configured to pass light therethrough, said receiver being aligned with said light emitter such that light from said light emitter travels through said receiver, said receiver including a stem and a disk being coupled to said stem, said receiver having an aperture extending through said stem and said disk, said aperture having a bounding surface, said bounding surface
being threaded, said stem engaging said light opening in said front wall of said housing having said disk being spaced from said front wall, said disk abutting the cabinet door having said aperture being aligned with a handle opening in the cabinet door, said aperture insertably receiving a handle of the cabinet door wherein said receiver is configured to transfer the light from said light receiver into the handle for ornamental purposes;

a lock being movably coupled to said housing, said lock being actuatable into a locking position to engage the cabinet for locking the cabinet door in a closed position, said lock being actuatable into an unlocked position having said lock disengaging the cabinet to facilitate the cabinet door to be opened, said lock being electrically coupled to said control circuit, said lock including an engagement that extends outwardly through said lock slot in said first lateral wall of said housing when said lock is actuated into said locking position such that said engagement engages the cabinet, said engagement being recessed into said lock slot when said lock is actuated into said unlocked position, said lock being actuated into said locking position when said control circuit receives said lock input, said lock being actuated into said unlocked position when said control circuit receives said unlock input;

a camera being coupled to said housing wherein said camera is configured to record video of an interior of the cabinet, said camera being positioned on said back wall of said housing, said camera being electrically coupled to said control circuit, said camera being turned on when said control circuit receives said motion input;

a motion sensor being coupled to said housing wherein said motion sensor is configured to sense motion of the cabinet door when the cabinet door is opened, said motion sensor being electrically coupled to said control circuit, said motion sensor being positioned on said back wall of said housing, said control circuit receiving said motion input when said motion sensor senses motion;

a smoke detector being coupled to said housing wherein said smoke detector is configured to detect smoke in the cabinet, said smoke detector being electrically coupled to said control circuit, said control circuit receiving said alert input when said smoke detector detects smoke;

a carbon monoxide detector being coupled to said housing wherein said carbon monoxide detector is configured to detect carbon monoxide in the cabinet, said carbon monoxide detector being electrically coupled to said control circuit, said control circuit receiving said alert input when said carbon monoxide detector detects carbon monoxide;

a transceiver being coupled to said housing, said transceiver being electrically coupled to said control circuit, said transceiver being in electrical communication with a personal electronic device wherein said transceiver is configured to facilitate a user to remotely monitor the cabinet, said transceiver receiving a lock command and an unlock command from the personal electronic device, said control circuit receiving said lock input when said transceiver receives said lock command, said control circuit receiving said unlock input when said transceiver receives said unlock command; and a power supply being coupled to said housing, said power supply being electrically coupled to said control circuit, said power supply comprising: at least one battery being positioned in said housing, said at least one battery being electrically coupled to said control circuit; and a charge port being recessed into said housing wherein said charge port is configured to receive a charge cord, said charge port being electrically coupled to said at least one battery for charging said at least one battery.

* * * * *